United States Patent [19]

Wichmann

[11] Patent Number: 4,613,231
[45] Date of Patent: Sep. 23, 1986

[54] LASER RANGE FINDER WITH NON-LINEARITY COMPENSATION

[75] Inventor: Guenter Wichmann, Leimen, Fed. Rep. of Germany

[73] Assignee: Eltro GmbH, Fed. Rep. of Germany

[21] Appl. No.: 587,316

[22] Filed: Mar. 7, 1984

[30] Foreign Application Priority Data

Mar. 19, 1983 [DE] Fed. Rep. of Germany ....... 3310055

[51] Int. Cl.⁴ .............................................. G01C 3/08
[52] U.S. Cl. ........................................ 356/5; 343/7.3; 343/13 R; 367/99; 367/101; 367/102
[58] Field of Search .................. 356/5; 343/13 R, 7.3; 367/99, 101, 102

[56] References Cited

U.S. PATENT DOCUMENTS 3,900,260 8/1975 Wendt ...................................... 356/5

Primary Examiner—S. C. Buczinski
Attorney, Agent, or Firm—Handal & Morofsky

[57] ABSTRACT

The receiver (3') of a laser range finder operating on the pulse propagation and including a transmitter unit (1) and a first receiver unit (2) is sampled by a spike pulse (5) derived from the transmitter pulse in such a way as to produce a low-frequency representation (10). The non-linearity of the phase modulation of this spike pulse, which is detrimental in very accurate measurements taken over long distances, is eliminated in that the oscillations of high-frequency oscillator (8) are supplied to a second receiver unit (2') in which they are scanned by the same spike pulse (5) and are then also suitably transformed into a low-frequency representation (10'). A counter (12) then counts the low-frequency zero-passages of the oscillator, beginning with the onset of the low-frequency cycle, thereby eliminating all errors (FIG. 1).

5 Claims, 4 Drawing Figures

LASER RANGE FINDER WITH NON-LINEARITY COMPENSATION

TECHNICAL FIELD

The invention relates to a laser range finder of the type which uses pulse propagation and the sampling principle to measure range.

BACKGROUND ART

Laser range finders operating on pulse propagation generally do not take into consideration the inaccuracies caused by non-linearity of phase modulation of the spike or sampling pulse, derived from the transmitted pulse and which scans the received diode signals with a defined time delay. Failure to correct for the non-linearity leads to difficulties if it is desired to measure distances very accurately, for example, with errors less than one percent. In particular, the non-linearity also introduces an error in the time access of the signal pulse transformed into the low-frequency region.

DISCLOSURE OF THE INVENTION

In accordance with the invention, such laser range finders are improved by compensating for the small inaccuracies which result from the non-linearity of the phase modulation of the sampling pulse. This is obtained, in accordance with the invention, by providing two parts of the inventive circuitry with the same non-linearity in such a manner that both non-linearities cancel each other. In this way all errors produced during the phase or propagation modulation are removed. Moreover, the required counting of zero-crossings no longer needs to be performed in the high-frequency domain. This brings the additional advantage, significant for many purposes, of being able to make extremely accurate measurements at long distances. This is particularly significant because currently commercially available counter modules have a frequency response limit on the order of 500 MHz, which corresponds to a change of distance (or an accuracy of measurement) of 30 cm. In contrast, the range finder according to the present invention can process a quartz oscillator frequency of up to approximately 20 GHz, which corresponds to a change in distance or an accuracy of measurement of 0.75 cm.

BRIEF DESCRIPTION OF DRAWINGS

One way of carrying out the invention is described in detail below with reference to drawings which illustrate only one specific embodiment, in which.

BEST MODE FOR CARRYING OUT THE INVENTION

Figure 1:
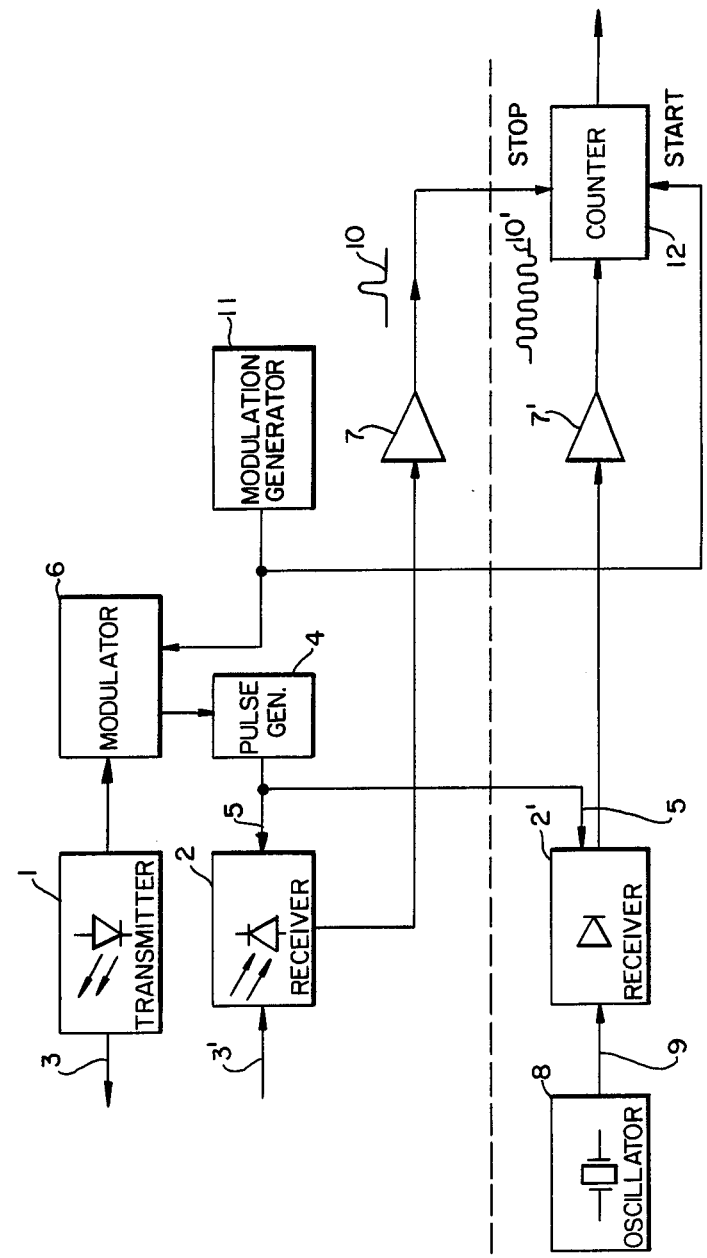
FIG. 1 is a block diagram of a laser range finder constructed in accordance with the present invention.
Figure 2:
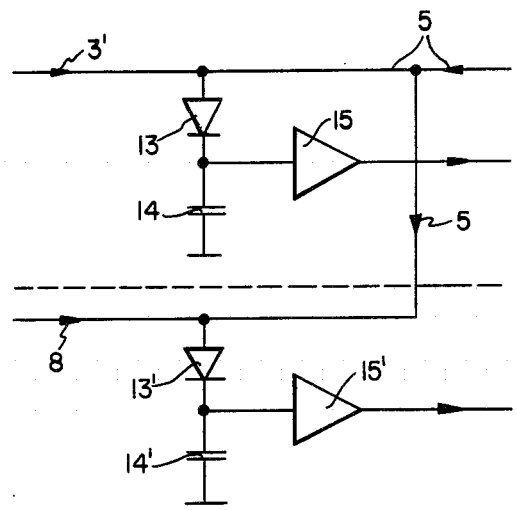
FIG. 2 is a more detailed schematic diagram of a part of a laser range finder illustrated in FIG. 1.

As illustrated in FIGS. 1 and 2, a system for measuring range in accordance with the invention is illustrated. A laser pulse 3 is transmitted by a transmitter 1 and a given fraction of pulse 3 becomes a received pulse 3' after being reflected from a target (not shown in the drawings). For purposes of illustration, we will consider a specific example of the invention where the transmitted pulse has a duration of 10 nsecs and a repetition rate of 40 kHz. In such a case, the pulse could be used to measure the range of objects having distances in the range between zero and 2000 meters. A spike pulse or sampling pulse 5 is generated by pulse generator 4. The sampling pulse is derived from the transmitted pulse and has the same frequency as the transmitted laser pulse 3, but is phase-modulated with respect thereto by modulator 6.

Modulation generator 11 generates a saw tooth voltage having a frequency, in the embodiment of the present example, of 0.33 Hz. The transmitted pulse sent from transmitter 1 to modulator 6 is modulated in phase by modulator 6 in accordance with the magnitude of the periodic signal output by modulation generator 11. Thus the phase delay of pulse 5 with respect to the transmitted pulse 3 is modulated in proportion to the magnitude of the output of modulation generator 11. It thus has the same frequency as the transmitted pulse 3 but is phase modulated with respect thereto. For each pulse produced by transmitter 1, pulse generator 4 produces a pulse which is delayed in time by an amount which corresponds to the value of the saw tooth signal output of modulation generator 11. In the present example, the delay varies periodically between zero and 13.333 $\mu$secs. This time corresponds to the round trip distance for an intended monitoring range of 2000 meters. Thus at the beginining of the periodic output of modulation generator 11, the delay is zero and at the end of the cycle the delay is approximately $13\frac{1}{3}$ $\mu$secs.

As shown in FIG. 2, the received pulse 3' is sampled by the sampling pulse 5 which is sent to capacitor 14 via diode 13. Amplifier 15 is driven by the junction between the diode and the capacitor. At the capacitor there is generated a saw tooth voltage with peak amplitude equal to the sum of the two instantaneous values. Therefore, if the signal pulse is present, a low-frequency signal 10, which is extended in time with respect to the original pulse, is generated.

Up to this point, the structure described is similar to the subject matter described in the above-referenced parent U.S. application. Reference is also made to U.S. Pat. Nos. 2,951,181 and 3,278,846 which describe devices operating according to the sampling principle.

Figure 3A:
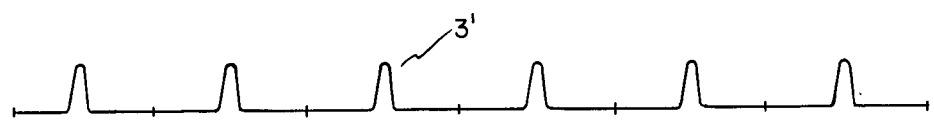
FIGS. 3(a) and 3(b) are pulse diagrams illustrating the non-linearity as between the received signal and the sampling pulse.
Figure 3B:
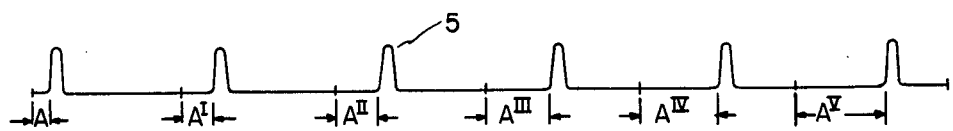

In FIG. 3(a) the pulse output of laser signal 3' reflected by a target is illustrated. FIG. 3(b) shows, at points corresponding A to A$^\nu$ along the low-frequency saw tooth scan of modulation generator 11, the variable delay of pulse 5 with respect to the received laser pulse 3'. This delay is produced by phase modulation of the sampling pulse 5. For extremely accurate measurements of distance, the linearity required by the variable delay is so great as to be practically unrealizable.

In order to make such high linearity unnecessary, it is proposed, in accordance with the invention, to produce signals with a quartz oscillator 8 and send them to a second receiver system as illustrated below the dashed line in FIGS. 1 and 2. This signal, which in accordance with the illustrated example is a sinusoidal signal having a frequency of 1.5 GHz is transformed into the low frequency domain by diode 13', capacitor 14' and amplifier 15' to form a series of pulses 10', as illustrated in FIG. 1. It is noted that the frequency of 1.5 GHz is selected inasmuch as this frequency accomodates a single zero crossing for each meter of path length.

The low-frequency signal 10' has the same time-axis linearity errors as are produced on the time-axis of the low-frequency representation of the received pulse. This occurs because both low-frequency signals, obtained in accordance with the sampling principle, are the result of a combination of either the received pulse or the output of crystal oscillator 8 and the output of pulse generator 4, with its attendant non-linearities.

In a manner similar to the sampling of the received pulse by that portion of the circuit of FIG. 2 above the dashed line, oscillator 8 supplies the additional receiver unit 2', which is sampled by the same sampling pulse 5. The oscillator signal and the sampling pulse 5 are passed to capicator 14' via diode 13'. In similar fashion also, amplifier 15' is driven by the junction between the diode and the capacitor, and this results in producing at the capacitor a low-frequency representation or transformation of, in this case, the high-frequency oscillator output of crystal oscillator 8.

After generation of the low-frequency representation at the capacitor, as shown in FIG. 1, the low-frequency amplifier 7' produces an amplified signal 10' which is applied to counter 12. This low-frequency signal, in the particular embodiment herein described, has a frequency of approximately 1.5 kHz, with each zero crossing corresponding to a distance of 10 cm. This signal is then applied to counter 12. The counter is triggered anew for each low-frequency scan of the low-frequency saw tooth signal produced by modulation generator 11. Counter 12 counts the zero-crossings of the low-frequency signal supplied by amplifier 7' until the arrival of a stop signal which is derived from the low-frequency signal produced by the receiver unit 2. This pulse is illustrated at 10 in FIG. 1. Inasmuch as the stop pulse 10 and the counter pulse 10' are both derived by low-frequency transformation of the received pulse and the output of crystal oscillator 8, errors produced during phase modulation of the sampling pulse are eliminated.

A laser range finder as described herein above may be used, for example, as a proximity sensor. However, it is usable in principle, for all purposes where it is necessary to make high accuracy measurements over long distances. Another example of such use is in the building of bridges or other structures by ordnance personnel.

While an illustrative embodiment of the invention has been described, it is, of course, understood that various modifications will be obvious to those of ordinary skill in the art. In addition, it is possible to use specific upper harmonics in the low-frequency domain to filter out approximately a fifth or tenth multiple of the oscillator frequency, so that the accuracy of measurement of the system can be pushed into the region of a few millimeters or even fractions thereof. Such modifications are within the spirit and scope of the invention which is limited and defined only by the appended claims.

I claim:

1. A laser range finder, comprising:
   (a) transmitter means for providing transmitter pulses;
   (b) light emitting means for emitting light pulses in response to said transmitter;
   (c) modulation generation means for generating a phase modulation control signal;
   (d) phase modulation means responsive to said transmitter means and said modulation generation means to produce pulses delayed in time with respect to said transmitter pulses by a delay proportional to said phase modulation control signal;
   (e) first receiver means for receiving reflections of said transmitted light pulses reflected by an object whose range is to be measured;
   (f) sampling means responsive to said first receiver means for generating a first low-frequency representation of the reflected pulses;
   (g) trigger means responsive to said sampling means to produce a trigger signal in response to the first low-frequency representation produced by said sampling means;
   (h) high-frequency oscillator means for generating high-frequency oscillations with a frequency which corresponds to the desired accuracy of measurement;
   (i) means for transposing said high-frequency oscillations, utilizing a sampling pulse, into a second low-frequency representation; and
   (j) counter means for counting the low-frequency zero-crossings of the second low-frequency representation produced by said means for transposing said high-frequency oscillations, said counts beginning with the onset of the low-frequency cycle produced by said modulation generation means.

2. A laser range finder as in claim 1, wherein said means for transposing said high-frequency oscillations is a second receiver means responsive to said high-frequency oscillator means, said second receiver means using a sampling pulse to produce a low-frequency representation which is applied via a low-frequency amplifier to said counter means, and wherein said counter means is stopped by the low-frequency signal from said first receiver means.

3. A laser range finder according to claim 2, wherein the high-frequency oscillator means is a constant-frequency crystal controlled oscillator.

4. A laser range finder, comprising:
   (a) transmitter means for providing transmitter pulses;
   (b) light emitting means for emitting light pulses in response to said transmitter means;
   (c) modulation generation means for generating a phase modulation control signal which scans a range of values;
   (d) phase modulation means responsive to said transmitter means and said modulation generation means to produce pulses delayed in time with respect to said transmitter pulses by a delay proportional to said phase modulation control signal;
   (e) first receiver means for receiving reflections of said transmitted light pulses reflected by an object whose range is to be measured;
   (f) first sampling means responsive to said first receiver means and said phase modulation means for generating a first low-frequency representation of the reflected pulses;
   (g) trigger means responsive to said sampling means to produce a trigger signal in response to the first low-frequency representation produced by said sampling means;
   (h) high-frequency oscillator means for generating high-frequency oscillations;
   (i) second sampling means responsive to said phase modulation means for transposing said high-frequency oscillations, utilizing a sampling pulse, into a second low-frequency representation; and
   (j) counter means for counting the low-frequency zero-crossings of the second low-frequency representation produced by said means for transposing said high-frequency oscillations.

5. Apparatus as in claim 4, wherein said count begins with the onset of a scan in the low-frequency cycle produced by said modulation generation means and ends in response to said trigger signal.

* * * * *